United States Patent [19]

Okita et al.

[11] Patent Number: 4,658,191
[45] Date of Patent: Apr. 14, 1987

[54] MOTOR ROTATION CONTROL APPARATUS

[75] Inventors: Masaya Okita, Yokohama; Masahiro Sawada, Kawasaki; Tadashi Ota, Tokyo, all of Japan

[73] Assignee: Nippon Kogaku K.K., Tokyo, Japan

[21] Appl. No.: 844,236

[22] Filed: Mar. 25, 1986

Related U.S. Application Data

[63] Continuation of Ser. No. 764,975, Aug. 12, 1985, abandoned, which is a continuation-in-part of Ser. No. 594,364, Mar. 28, 1984, abandoned.

[30] Foreign Application Priority Data

Mar. 31, 1983 [JP] Japan .................................. 58-53806

[51] Int. Cl.⁴ ........................................... H02P 5/16
[52] U.S. Cl. ................................. 318/314; 318/341; 318/608; 318/326
[58] Field of Search ............... 318/314, 608, 341, 326, 318/327

[56] References Cited

U.S. PATENT DOCUMENTS

| | | | |
|---|---|---|---|
| 3,829,747 | 8/1979 | Woolfson et al. | 318/314 X |
| 3,950,682 | 4/1976 | Dohanich | 318/314 |
| 4,380,723 | 4/1983 | Leis et al. | 318/314 |

Primary Examiner—Benjamin Dobeck
Attorney, Agent, or Firm—Michael N. Meller

[57] ABSTRACT

A control apparatus whereby each time a motor adapted to start and stop its rotation repeatedly a plurality of times is rotated, the phase reference of a rotating object is adjusted and the rotating object is locked to a normal speed in a short period of time from the start. The control apparatus includes circuitry for detecting that the difference between the phase of a detection clock signal and the phase of rotation of the motor is less than predetermined value and the control of the motor is switched between the speed control and the phase control in accordance with the phase difference.

4 Claims, 10 Drawing Figures

MOTOR ROTATION CONTROL APPARATUS

This application is a continuation of application Ser. No. 764,975, filed Aug. 12, 1985, now abandoned, which is a continuation-in-part of application Ser. No. 594,364 filed Mar. 28, 1984 and now abandoned.

BACKGROUND OF THE INVENTION

The present invention relates to apparatus for controlling the rotation of motors. More particularly, the invention relates to a motor rotation control apparatus so designed that the phase of a rotation signal of a frequency corresponding to the rotation speed of a motor is compared with the phases of a reference clock lock signal and thus the motor is controlled in accordance with the result of the comparison so as to make its rotational phase coincide with that of the reference clock lock signal.

Methods heretofore known for controlling the rotation of motors include a phase control method and a speed control method. The phase control method is one in which the phase of a rotational phase signal generated one per revolution of a motor is controlled to make it coincide with the phase of a reference clock signal, and the speed control method detects the rotation speed of a motor to control its rotation.

While the phase control method ensures a high degree of accuracy as compared with the speed control method, there is a disadvantage that during the starting of a motor the rise in the motor speed is slow and hence a considerable time is required from the start to a locking-in.

Recently, small electronic still picture cameras incorporating a magnetic disk type recorder have been proposed and it is desirable for this type of camera that the rotation of the disk is started through the half depression of the shutter button just before taking a photograph or any other means and the disk is stopped upon completion of the recording thereby reducing the electric power consumption due to the rotation of the disk. However, since naturally no picture can be recorded during the interval between the time that the rotation of the disk is started and the time that the desired rotation at which its phase coincides with the phase of the reference clock is attained (this is hereinafter referred to as a lock-in condition), the interval of time between the starting and the lock-in must be reduced as far as possible. For example, with a disk control apparatus for electronic still picture cameras, each time the rotation of the disk, which has previously been rotated and then stopped, is started again, the disk should preferably be controlled to properly adjust the phase reference to the disk. More specifically, where a picture for one field or frame is recorded on each track, while the phase reference need not necessarily be adjusted to the other tracks, the adjustment of the phase reference to the other tracks has the effect of diametrically aligning the vertical synchronizing signals of all the tracks. This has many advantages in that the desired lock-in condition is readily attained by the reproduced signal of the next track when switching from one frame to another during the reproduction and so on. Thus, the phase control should preferably be effected in such a manner that the phase reference of each track is adjusted to the other tracks, that is, the phase reference of the rotating object is adjusted every time in cases where the start and stop of the rotation of the rotating object are repeated a plurality of times.

SUMMARY OF THE INVENTION

With a view to overcoming the foregoing deficiencies in the prior art, it is the primary object of the present invention to provide an improved motor rotation control apparatus which is simple in construction, reduces the interval of time between the start and the lock-in condition of a rotating object and is capable of adjusting the phase reference of the rotating object upon each rotation in cases where the start and stop of the rotation of the rotating object are repeated a plurality of times.

BRIEF DESCRIPTION OF THE DRAWINGS

FIG. 7 is a timing chart showing the operation of the apparatus of FIG. 6 during the interval between the start and the lock-in.

DETAILED DESCRIPTION OF THE PREFERRED EMBODIMENTS

Figure 1:
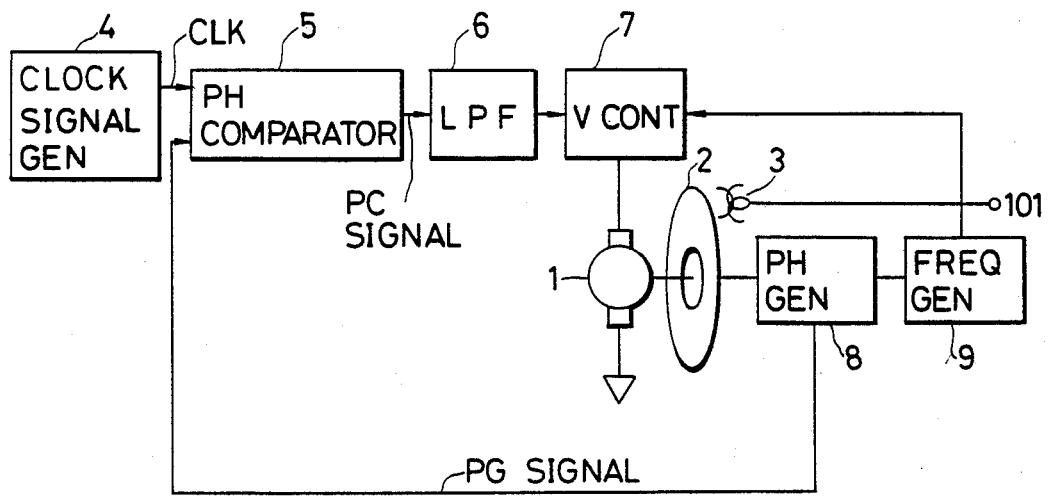
FIGS. 1 and 2 are block diagrams showing the construction of apparatus for explaining the principles of the present invention.
Figure 2:
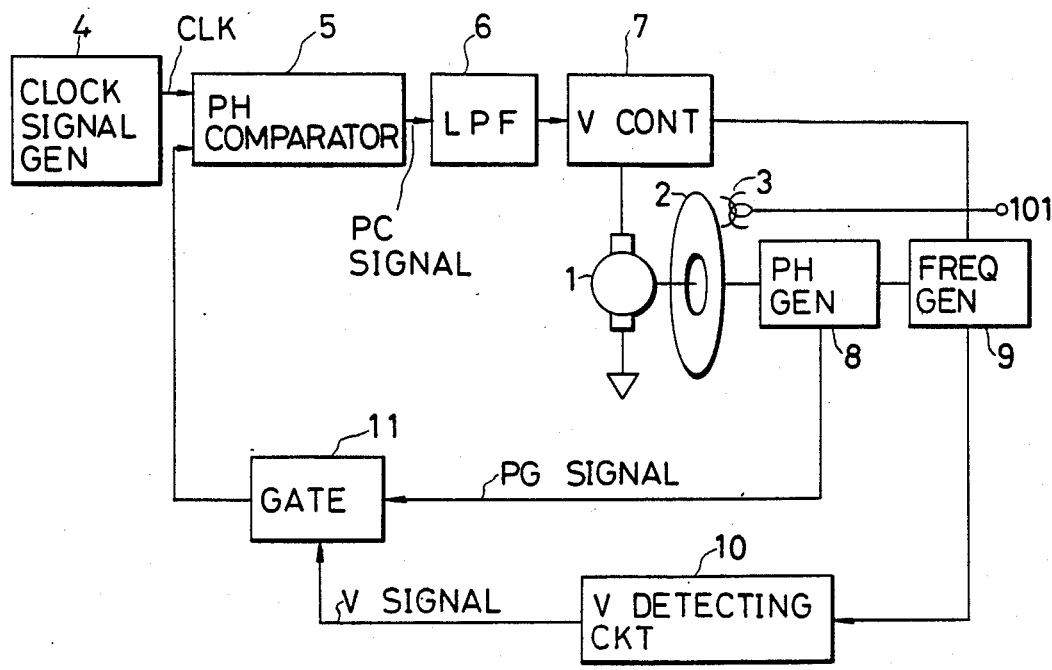

In describing an apparatus according to the invention, reference will be made first to FIGS. 1 and 2 showing the construction of apparatus for explaining the principles of the invention.

In FIGS. 1 and 2, numeral 1 designates a magnetic disk rotating motor, 2 a magnetic disk, 3 a recording head, 4 a generator for generating reference clock signals (hereinafter referred to as CLK signals) having the same period as the vertical synchronizing signals of video signals, 5 a phase comparator, 6 a low-pass filter, 7 a velocity control circuit for controlling the angular velocity of rotation of the motor 1, 8 a phase signal generator for generating a pulse (hereinafter referred to as a PG signal) for every revolution of the motor 1, and 9 a frequency generator for generating N pulses (hereinafter referred to as FG signals) for every revolution of the motor 1 and applying the pulse output to the velocity control circuit 7. Numeral 101 designates a recording signal input terminal for applying a recording signal to the recording head 3. The PG signal from the generator 8 goes to a high level (H level) only during a predetermined rotational angle in every revolution of the motor 1.

In FIG. 2 showing a modification of the apparatus shown in FIG. 1, a higher voltage is applied to the motor 1 as compared with the apparatus of FIG. 1, and there are additionally provided a velocity detecting circuit 10 for receiving as an input signal the pulse output from the frequency generator 9 to generate a signal (hereinafter referred to as a V signal) which goes to a low level (L level) when the rotation speed of the motor 1 is lower than a predetermined value and to the H level in the other conditions and a gate circuit 11 for passing the output of the phase signal generator 8 when the output of the velocity detecting circuit 10 goes to the H level.

Figure 3A:
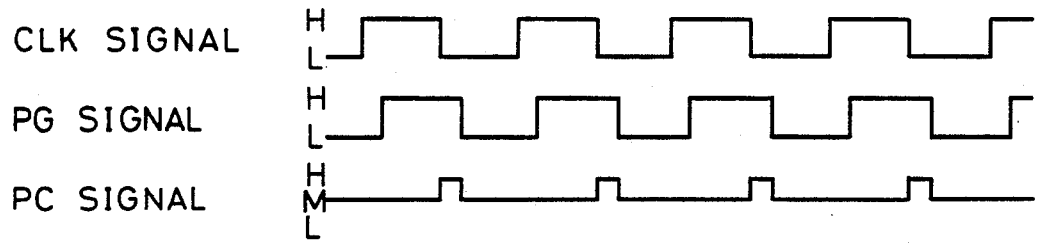
FIGS. 3A to 3C are timing charts showing the relation between the inputs and the output of the phase comparator in the apparatus of FIGS. 1 and 2.
Figure 3B:
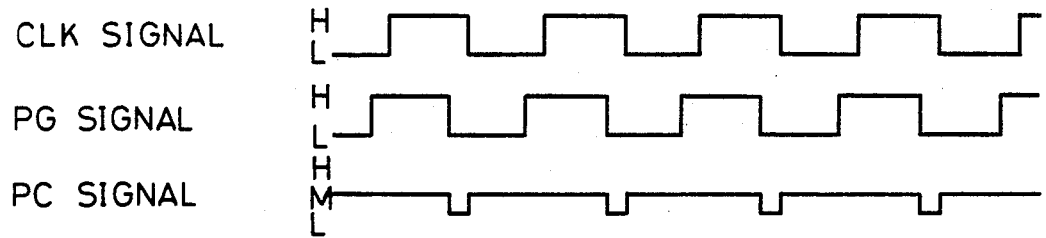
Figure 3C:
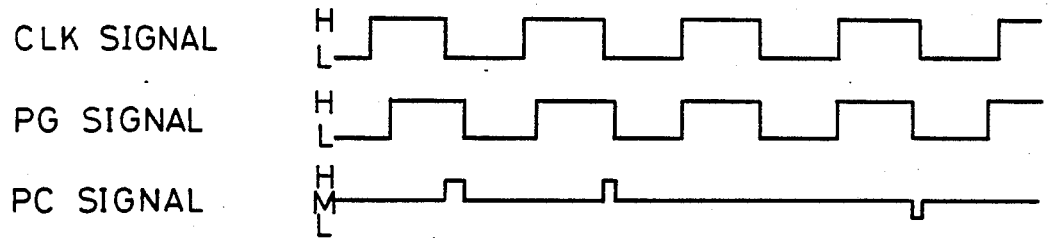

FIGS. 3A, 3B and 3C are timing charts showing the relation between the inputs and the output of the phase comparator 5, with FIG. 3A showing the case where the phase of the PG signal lags the phase of the CLK signal, FIG. 3B the case in which the phase of the PG signal leads the phase of the CLK signal and FIG. 3C the case in which the phase of the PG signal lags in the beginning, coincides with in the middle and then leads the phase of the CLK signal. Then, in each of FIGS. 3A, 3B and 3C, the output or the PC signal from the phase comparator 5 is a pulse of a width proportional to the phase difference between the falling edges of the CLK signal and the PG signal. This pulse is applied as a voltage signal proportional to the phase difference to the velocity control circuit 7 via the low-pass filter 6. The velocity control circuit 7 converts the frequency of the FG signal from the frequency generator 9 to a voltage and controls the voltage applied to the motor 1 in such a manner that the converted voltage becomes equal to the output voltage of the low-pass filter 6. Also, the output level of the phase comparator 5 is preset so that in the lock-in condition (the stable rotation speed condition), the output of the phase comparator 5 goes to a voltage level (hereinafter referred to as an M level) intermediate between the H and L levels so as to prevent the generation of any H level or L level pulse. When the output of the phase comparator 5 is at the intermediate voltage, the velocity control circuit 7 controls the motor 1 so that it attains the same rotation speed as in the lock-in condition.

Figure 4:
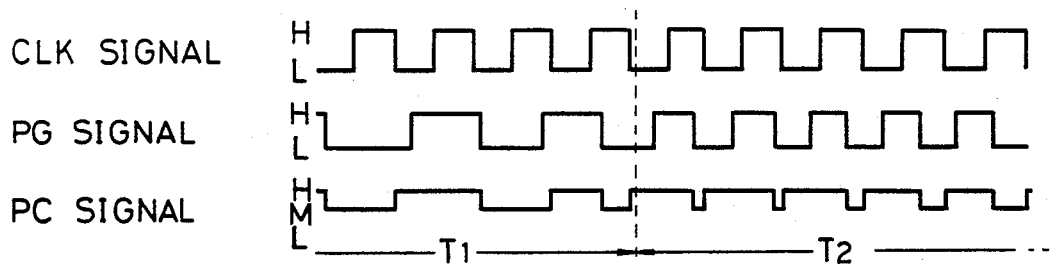
FIGS. 4 and 5 are timing charts for the starting of the apparatus shown in FIGS. 1 and 2, respectively.

FIG. 4 is a timing chart for the starting period of the apparatus of FIG. 1. In the apparatus of FIG. 1, immediately after the starting of the motor 1 the period of the PG signals is longer than the period of the CLK signals and the average voltage of the output from the phase comparator 5 is higher than the M level. When the rotation speed of the motor 1 is increased so that the period of the PG signals is decreased, although subject to variations more or less, the average voltage level of the output from the phase comparator 5 is decreased gradually so that it is substantially equal to the M level when the lock-in condition is attained. In FIG. 4, on and after the time indicated by the broken line, the rotation speed of the motor 1 becomes substantially equal to that in the lock-in condition and the phase locking operation is initiated. Thus, the lock-in condition is attained at the time (not shown) that the phase of the falling edges of the CLK and PG signals coincide. The interval of time between the starting and locking-in of the motor 1 may be roughly divided into two intervals. One is an interval $T_1$ for accelerating the motor 1 from its starting speed to a speed substantially equal to the lock-in rotation speed and another is an interval $T_2$ for locking the CLK and PG signals in phase. To reduce the time interval $T_1+T_2$ from the start to the lock-in, it is necessary to reduce each of the intervals $T_1$ and $T_2$. With this apparatus, however, the interval $T_1$ is long and it is impossible to reduce the interval of time from the starting to the locking in.

Figure 5:
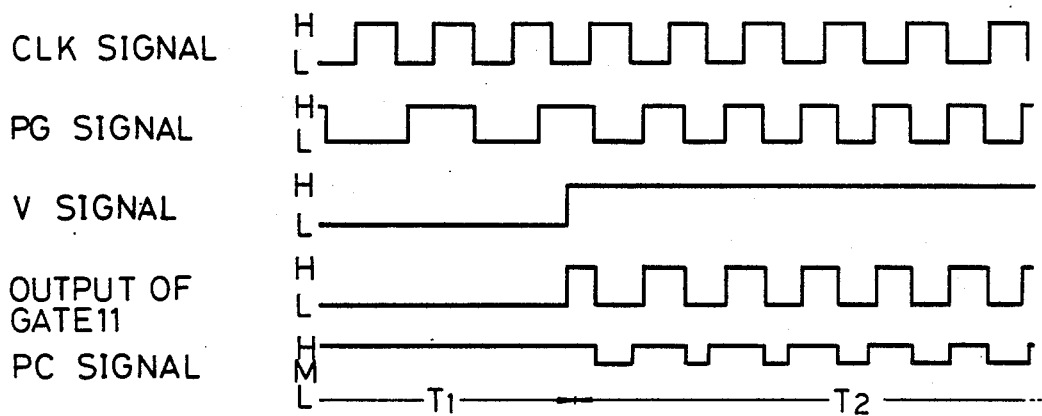

FIG. 5 is a timing chart for the starting period of the apparatus shown in FIG. 2.

In the apparatus of FIG. 2, during the interval from the time that the motor 1 is started to the time that the rotation speed exceeds a predetermined value, the output or the V signal from the velocity detecting circuit 10 remains at the L level and no PG signal is applied to one input of the phase comparator 5. As a result, the output PC signal from the phase comparator 5 is at the H level until the rotation speed exceeds the predetermined value and a higher voltage than in the apparatus of FIG. 1 is applied to the motor 1 from the start until the predetermined rotation speed is attained, thereby reducing the interval $T_1$ between the instance of starting and the instance of attaining the predetermined rotation speed. However, the apparatus of FIG. 2 is also the same with the apparatus of FIG. 1 as respect to the operation after the rotation speed has exceeded the predetermined value and thus the interval $T_2$ is not always reduced. Consequently, the interval $T_1+T_2$ between the instance of starting and the instance of locking-in by phase locking cannot be reduced stably.

While the interval between the time the motor 1 is started and the time it attains a predetermined rotation speed is dependent on the moment of inertia of the motor 1 and the disk 2, the torque constant of the motor 1, the power supply voltage, etc., assuming for example that the apparatus is incorporated in a small device, e.g., an electronic still picture camera, there are considerable restrictions due to the performance of the power supply and the motor, the space, etc., and therefore it is difficult to reduce the interval $T_1$ from the starting of the motor 1 to the time of attaining a predetermined rotation speed. However, the time required for attaining the lock-in condition by phase locking is considerably long as compared with the interval from the starting to the time of the rotation speed exceeding the predetermined value so that if the interval $T_2$ required to attain the lock-in condition by phase locking is reduced, it is possible to considerably reduce the interval from the starting to the locking-in.

Figure 6:
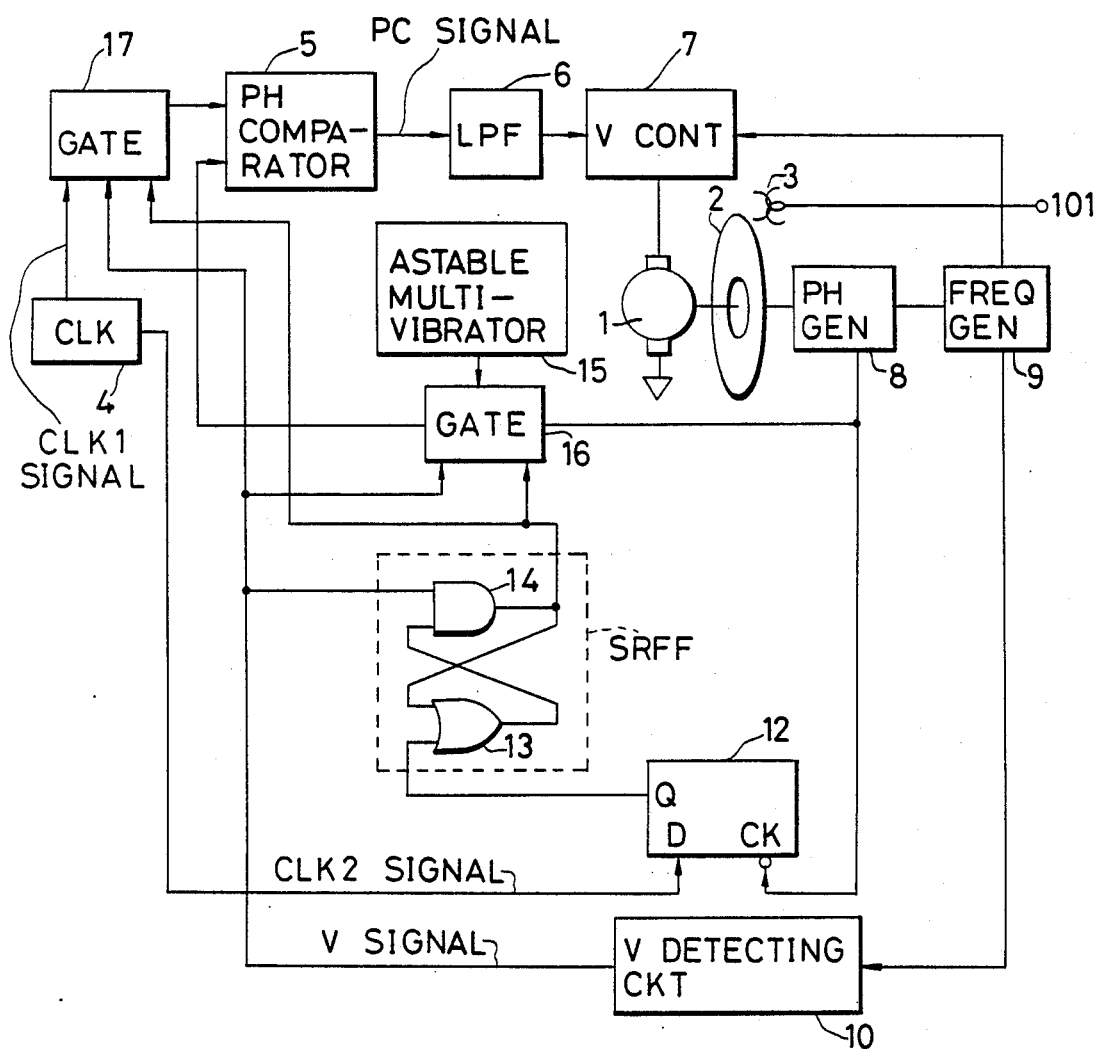
FIG. 6 is a block diagram showing the construction of an embodiment of the apparatus according to the invention.
Figure 7:
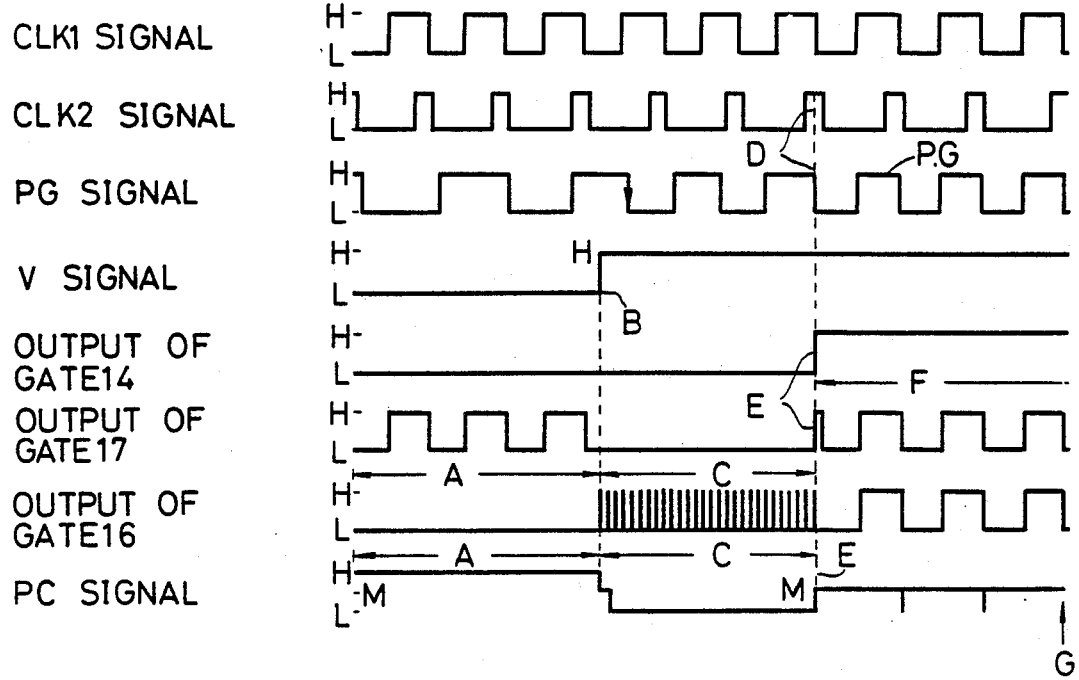

FIG. 6 is a block diagram showing the construction of an embodiment of the apparatus according to the invention and FIG. 7 is a timing chart for the interval from the starting to the locking-in of the apparatus shown in FIG. 6.

In FIG. 6, numerals 1 to 3, 5 to 10 and 101 designate the same component elements as used in the apparatus of FIGS. 1 and 2. Numeral 4 designates a clock signal generator which in this embodiment generates first reference clock signals (hereinafter referred to as CLK 1 signals) having the same period as the vertical synchronizing signals of video signals and applied to the phase comparator 5 and second reference clock signals (hereinafter referred to as CLK 2 signals) different in pulse width and phase from the CLK 1 signals and applied to a D-type flip-flop 12. The D-type flip-flop or DFF 12 latches the CLK 2 signal in response to the falling edge of the PG signal and it generates a H level signal when the phase difference between the falling edges of the CLK 1 signal and the PG signal applied to the phase comparator 5 is within a predetermined range. Numeral 13 designates an OR gate, and 14 an AND gate. These gates 13 and 14 form an SR flip-flop (hereinafter referred to as an SRFF) so that the output of the AND gate 14 goes to the L level when the output of the velocity control circuit 10 goes to the L level and goes to the H level in response to the positive-going transition of the output from the DFF 12 when the output of the velocity control circuit 10 is at the H level. Numeral 15 designates an astable multivibrator for generating a signal which is sufficiently higher in frequency than the CLK signal. Numerals 16 and 17 designate gate circuits which are each designed to control one of the two input signals to the phase comparator 5. The operation of the gate circuits 16 and 17 will now be described.

(1): When both the output from the velocity control circuit 10 and the output from the AND gate 14 go to the L level, the output of the gate circuit 16 goes to the L level and the gate circuit 17 generates the CLK 1 signals.

(2): When the output of the velocity control circuit 10 goes to the H level and the output of the AND gate 14 goes to the L level, the gate circuit 16 generates the output of the astable multivibrator 15 as such and the output of the gate circuit 17 goes to the L level.

(3): When both the output from the velocity control circuit 10 and the output from the AND gate 14 go to the H level, the gate circuit 16 generates the PG signal as such and the gate circuit 17 generates a single pulse of a sufficiently short pulse width as compared with the period of the CLK signals in response to the positive-going transition of the output from the AND gate 14 and then generates the CLK 1 signals as such.

The operation of the embodiment of the invention shown in FIG. 6 will now be described in correspondence to the operations (1), (2) and (3) of the gate circuits 16 and 17.

(1): In the apparatus of FIG. 6, during the interval between the time that the motor 1 is started and the time that a predetermined speed is attained, the output of the velocity detecting circuit 10 remains at the L level and the input to the phase comparator 5 includes only the CLK 1 signals as indicated at A of the output of the gate 17 and the PC signal in FIG. 7. Thus, the output of the phase comparator 5 is maintained at the H level as shown at A. Therefore, a high voltage is applied to the motor 1.

(2): When the motor 1 exceeds a predetermined speed, the output of the velocity detecting circuit 10 goes to the H level as shown at B of the V signal in FIG. 7 so that the inputs to the phase comparator 5 include the output of the astable multivibrator 15 and the L level output signal of the gate 17 as shown at C of the output of the gate 17 and the PC signal. As a result, the output of the phase comparator 5 goes to the L level as shown at C of the PC signal and the motor 1 is controlled at a rotation speed lower than the lock-in rotation speed.

(3): When the motor 1 is controlled at the rotation speed lower than the lock-in rotation speed so that the phase relation between the CLK 1 and PG signals changes at a constant rate, the output of the AND gate 14 goes to the H level as shown at E in response to the negative-going transition of the PG signal when the CLK 2 signal is at the H level as shown at D of the CLK 2 signal and the PG signal. When the output of the AND gate 14 goes to the H level, a single pulse Ps of a sufficiently small width as compared with the period of the CLK 1 signal, as shown at E of the output of the gate 17, is applied as the input to the phase comparator 5 and the output of the phase comparator 5 goes to the M level as shown at E of the PC signal. The motor 1 is controlled at substantially the same rotation speed as the lock-in rotation speed and also the CLK 1 signals and the PG signals are applied to the phase comparator 5 as shown at F, thereby effecting the phase comparison control and attaining the lock-in condition at G.

As described hereinabove, in accordance with the invention the phase comparison is initiated when the phase difference between the CLK 1 signal and the PG signal comes within a predetermined range and therefore the phases of the CLK 1 signal and the PG signal are already substantially in coincidence with each other at the instance of initiating the phase comparison. Thus, the interval of time from the instance of reaching the predetermined rotation speed to the lock-in condition is always reduced stably. This indicates that when the PG signal goes to the low level in the period where the CLK 2 signal is at the H level, the phase difference of the PG signal with respect to the CLK 1 signal is within the predetermined range. The pulse width of the CLK 1 signal and the phase difference between the CLK 1 signal and the CLK 2 signal are preset so as to give the above-mentioned relation.

Figure 8:
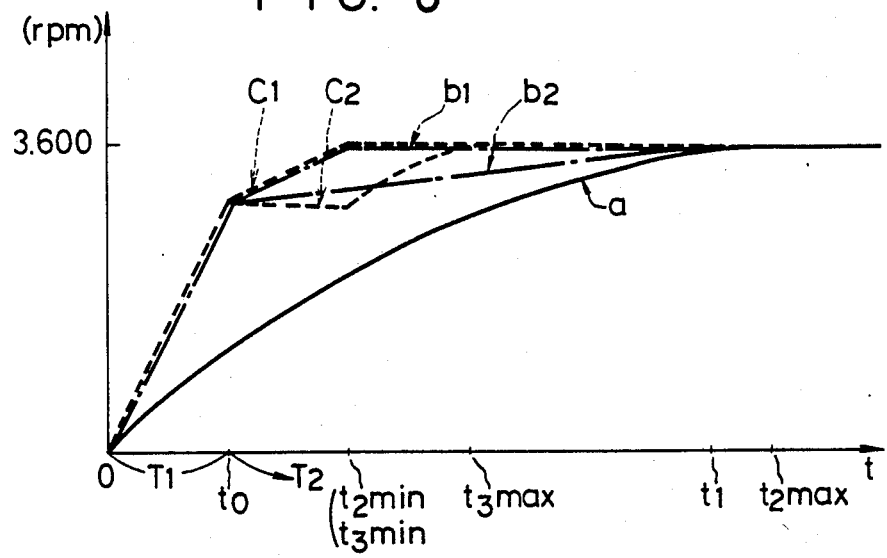
FIG. 8 is a graph showing the rotation characteristics of the apparatus according to the invention.

FIG. 8 is a graph showing rotation characteristics of the apparatus according to the invention and the apparatus of FIGS. 1 and 2 with the abscissa representing the time and the ordinate representing the rotation speed (rpm). In the graph, the solid line a shows the characteristic of the apparatus of FIG. 1, the dot-and-dash lines $b_1$ and $b_2$ the characteristics of the apparatus of FIG. 2 and the broken lines $C_1$ and $C_2$ the characteristics of the apparatus of FIG. 6.

The apparatus of FIG. 1 attains the lock-in condition at a time $t_1$ and the time required for attaining the lock-in condition is long although the variation is not so large. The apparatus of FIG. 2 attains the lock-in condition in the interval $t_2$ min to $t_2$ max and the variation is large. While, in the case of the curve $b_1$ showing the early attainment of the lock-in condition, the time is equal to the lock-in time $t_3$ min by the characteristic $C_1$ of the apparatus of the invention shown in FIG. 6 and it is very early, in the case of the curve $b_1$ the lock-in time may be as late as the time $t_2$max which is later than the time $t_1$. Thus, the lock-in time varies greatly and there is a lack of stability.

With the apparatus of this invention, the lock-in time is between the times $t_3$min and $t_3$max at the latest as shown by the curve $C_2$ showing that the lock-in time is short and its variation is also small.

FIG. 9 shows an exemplary construction of the velocity detecting circuit 10. In this circuit, a frequency of the output signal of the frequency generator 9 is converted into an electric voltage signal by means of the frequency/voltage converter 101. The voltage comparator 102 compares the output of the reference voltage $V_{ref}$ with that of the frequency/voltage convertor 101. The output voltage of the frequency/voltage convertor 101 is increased as the output frequency of the frequency generator 9 becomes higher, and when this output voltage exceeds the reference voltage $V_{ref}$, the output of the voltage comparator 102 changes from the L level to the H level.

FIG. 10 is an exemplary construction of the gate circuit 16. In this gate circuit, the inputs of AND gate 201 respectively receive the output of the velocity detecting circuit 10, i.e. "V signal", and a reversed output of the AND gate 14. The inputs of AND gate 202 respectively receive the output of AND gate 201 and the output of the astable multivibrator 15. The inputs of AND gate 203 respectively receive the PG signal and the output of the AND gate 14. The inputs of OR gate 204 respectively receive the output of AND gate 202 and the output of AND gate 203. The output of OR gate 204 serves as the output of gate circuit 16.

When the output of velocity detecting circuit 10 is at the L level, the output of AND gate 201 is also at the L level. In this case, the outputs of AND gates 202 and 203 also go to the L level, as a result of which the output of OR gate 204 is at the L level. When the output of the velocity detecting circuit 10 is at the H level and the output of AND gate 14 is at the L level, the output of AND gate 201 goes to the H level, and the output of AND gate 203 goes to the L level, whereby AND gate 202 produces the output of the astable multivibrator 15. Consequently, the OR gate 204 produces this output of the astable multivibrator 15. When the output of the velocity detecting circuit 10 as well as the output of AND gate 14 are at the H level, the outputs of AND gate 201 and AND gate 202 go to the L level, whereby AND gate 203 produces the PG signal. Consequently, OR gate 204 outputs the PG signal.

FIG. 11 is an exemplary construction of the gate circuit 17. In this gate circuit, the monostable multivibrator (hereinafter referred to as "M.M.") produces one pulse whose width is substantially shorter than the period of the CLK1 signal in response to the leading edge of the output of AND gate 14. The D-type flip-flop 302 produces the output of H level in response to the following edge of the pulse produced by the M.M. 301. When the V signal of the velocity detecting circuit 10 is at the L level, the flip-flop 302 is reset to be at the L level. The inputs of OR gate 303 respectively receive the reversed V signal from the velocity detecting circuit 10 and the output of the D-type flip-flop 302. The inputs of AND gate 304 respectively receive the CLK1 signal and the output of OR gate 303. The inputs of OR gate 305 respectively receive the output of AND gate 304 and the output of the M.M. 301. The output of the OR gate 305 is used as the output of gate circuit 17.

When the V signal from the velocity detecting circuit 10 is at the L level with the output of AND gate 14 being at the L level, then the M.M. 301 does not operate and the D-type flip-flop 302 is in the reset condition. In this case, the output of OR gate 303 goes to the H level, and both AND gate 304 and OR gate 305 produce the CLK1 signal. When the V signal from the velocity detecting circuit 10 is at the H level with the output of AND gate 14 being at the L level, then the M.M. 301 does not operate and the output of the D-type flip-flop 302 remains at the L level due to the fact that the CK input remains at the L level, although the reset condition of the flip-flop is released. In this state, the OR gate 303 goes to the L level, and both AND gate 304 and OR gate 305 go to the L level. When the output of the AND gate 14 is changed from the L level to the H level with the output of the velocity detecting circuit 1 being at the H level, then the M.M. 301 produces one pulse whose width is substantailly shorter than the period of the reference clock signal, and this produced pulse is passed through the OR gate 305. In response to the following edge of this pulse, the output of the D-type flip-flop 302 goes to the H level, whereby the output of OR gate 303 goes to the H level, and both AND gate 304 and OR gate 305 produce the CLK1 signal.

What is claimed is:

1. An apparatus for controlling the phase of rotation of a motor in accordance with a reference clock signal and thereby controlling the rotation speed of the motor to attain a predetermined rotation speed, said apparatus comprising:
   (a) driving means for driving said motor into rotation;
   (b) rotation speed detecting means connected to said motor for detecting that the rotation speed of said motor is substantially equal to a reference rotation speed which is lower than said predetermined rotation speed and generating a first control signal only in response to the rotation speed of said motor being greater than or equal to said reference rotation speed;
   (c) means for generating said reference clock signal and a detection clock signal having a predetermined frequency equal to the frequency of said reference clock signal and having a predetermined phase different than the phase of said reference clock signal;
   (d) means for producing a rotation signal which represents the rotation of said motor;
   (e) first phase difference detecting means for detecting that a phase difference between said detection clock signal and said rotation signal is less than a predetermined value during the generation of said first control signal and for producing a second control signal in response thereto; and
   (f) control means including second phase difference detecting means for detecting a phase difference between said reference clock signal and said rotation signal in response to said second control signal and producing a phase difference signal indicative of said detected phase difference and means connected to said motor for controlling said driving means in accordance with said phase difference signal so that said detected phase difference corresponds with a predetermined phase difference.

2. An apparatus according to claim 1, wherein said control means further includes means for controlling said driving means in response to said first control signal so as to control the rotation speed of said motor at a rotation speed preset lower than said predetermined rotation speed.

3. An apparatus for controlling the phase of rotation of a motor for rotating a disk which records video signals in accordance with vertical synchronizing signals and thereby controlling the rotation speed of the motor so as to attain a predetermined rotation speed, said apparatus comprising:
   (a) means for driving said motor into rotation;
   (b) rotation speed detecting means connected to said motor for detecting that the rotation speed of said motor is substantially equal to a reference rotation speed which is lower than said predetermined rotation speed and generating a first control signal only in response to the rotation speed of said motor being greater than or equal to said reference rotation speed;
   (c) means for generating a reference clock signal and a detection clock signal which has a predetermined frequency equal to the frequency of said reference clock signal and which has a predetermined phase different than the phase of said reference clock signal;
   (d) means for generating at least one pulse for every rotation of said motor;
   (e) first phase difference detecting means connected to receive said pulse, said first control signal and said detection clock signal, said phase difference detecting means detecting that a phase difference between said detection clock signal and said pulse is less than a predetermined value during receipt of said first control signal and producing a second control signal in response thereto; and
   (f) control means including second phase difference detecting means for detecting a phase difference between said reference clock signal and said pulse in response to said second control signal and producing a phase difference signal indicative of said detected phase difference and means connected to said motor for controlling said driving means in a direction to make said detected phase difference correspond to a predetermined phase difference in accordance with said phase difference signal.

4. An apparatus according to claim 3, wherein the period of said reference clock signals is substantially the same with the period of said vertical synchronizing signals.

* * * * *